US008896979B2

(12) United States Patent
Saito et al.

(10) Patent No.: US 8,896,979 B2
(45) Date of Patent: Nov. 25, 2014

(54) ARRESTER

(71) Applicants: Hiroki Saito, Tokyo (JP); Akihide Ozaki, Tokyo (JP); Koichi Akaso, Tokyo (JP)

(72) Inventors: Hiroki Saito, Tokyo (JP); Akihide Ozaki, Tokyo (JP); Koichi Akaso, Tokyo (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 83 days.

(21) Appl. No.: 13/851,252

(22) Filed: Mar. 27, 2013

(65) Prior Publication Data

US 2014/0153152 A1 Jun. 5, 2014

(30) Foreign Application Priority Data

Nov. 30, 2012 (JP) ................................ 2012-262393

(51) Int. Cl.
*H02H 9/00* (2006.01)
*H05F 3/02* (2006.01)

(52) U.S. Cl.
CPC ....................................... *H05F 3/02* (2013.01)
USPC ......................................................... 361/127

(58) Field of Classification Search
USPC .......................................................... 361/127
See application file for complete search history.

(56) References Cited

U.S. PATENT DOCUMENTS

| | | | | |
|---|---|---|---|---|
| 4,989,115 | A * | 1/1991 | Bourdages et al. | 361/126 |
| 8,077,442 | B2 * | 12/2011 | Saito et al. | 361/127 |
| 8,243,413 | B2 * | 8/2012 | Harada et al. | 361/127 |

FOREIGN PATENT DOCUMENTS

JP 2003-297609 A 10/2003

* cited by examiner

*Primary Examiner* — Stephen W Jackson
(74) *Attorney, Agent, or Firm* — Buchanan Ingersoll & Rooney PC

(57) ABSTRACT

An arrester includes a stacked internal element, a pair of electrodes respectively arranged on both sides of the internal element in a stacking direction, a plurality of FRP rods arranged so as to surround the internal element each having a flat plate shape extending in the stacking direction and including protruding portions in a dumbbell shape with a width increasing from a center side to an end side in an axial direction at a constant inclination angle and then becoming a constant width thereafter, the FRP rods being fixed by the protruding portions respectively being fitted into electrode grooves respectively provided on the electrodes, and an outer cover formed of polymer material and integrally covering at least the internal element, the electrodes, and the FRP rods.

5 Claims, 3 Drawing Sheets

ARRESTER

BACKGROUND OF THE INVENTION

1. Field of the Invention

The present invention relates to an arrester that is used for protecting an electric apparatus from an abnormal voltage penetrating into a system in an electric power plant, a substation and the like.

2. Description of the Related Art

A polymer arrester in which an internal element including a zinc oxide element is directly molded with a polymer such as silicon rubber is provided with a mechanical strength by an insulating support member such as a glass fiber reinforced plastic (GFRP) arranged so as to surround the zinc oxide element.

Generally, an FRP in which a glass fiber is extended in one direction has an excellent mechanical strength against a tensile load or a bending load exerting in a direction perpendicular to the direction of the glass fiber. However, the mechanical strength is not high against a shear load exerting in a direction parallel to the direction of the glass fiber. Therefore, a shape of an FRP and a method of fixing electrodes arranged at both ends of a zinc oxide element and the FRP are key factors in the configuration of a polymer arrester.

In a conventional polymer arrester disclosed in Japanese Patent Application Laid-open No. 2003-297609, an FRP and electrodes are fixed by fitting the FRP, provided with wide portions each having a substantially isosceles triangular or circular shape provided at both end portions thereof, into the electrodes each having a groove of the same shape (substantially isosceles triangular or circular shape) as that of each of the wide portions of the FRP, and the FRP is prevented from falling off by each of the wide portions of the FRP being hooked into each of the grooves of the electrodes.

However, with the configuration of the polymer arrester disclosed in Japanese Patent Application Laid-open No. 2003-297609, when a bending load is applied to the arrester, a bending stress is generated in the base of the wide portion of the FRP, and when a tensile load is applied to the arrester, a shear stress is generated in the wide portion of the FRP.

Therefore, in the conventional configuration, in order to improve the mechanical strength against the bending load, it is required to increase the width of the FRP when the thickness of the FRP is kept constant. Further, in order to improve the mechanical strength against the tensile load, it is required to increase the dimension of the wide portion. Therefore, in either case, the sizes of the FRP and the electrode are increased. In addition, when the dimension of the wide portion is increased, there is another problem that it is not cost effective because a processing portion of the FRP is increased.

SUMMARY OF THE INVENTION

It is an object of the present invention to at least partially solve the problems in the conventional technology.

According to an aspect of the present invention, there is provided an arrester, the arrester including a nonlinear resistive element which is stacked; a pair of electrodes respectively arranged on both end sides of the nonlinear resistive elements in a stacking direction; a plurality of insulation rods arranged so as to surround the nonlinear resistive element, each of the insulation rods having a flat plate shape extending in the stacking direction and including end portions in a dumbbell shape with a width increasing from a center side to an end side in an axial direction at a constant inclination angle and then becoming a constant width thereafter, the insulation rods being fixed by the end portions respectively being fitted into electrode grooves respectively provided on the pair of electrodes; and an outer cover formed of polymer material and integrally covering at least the nonlinear resistive element, the pair of electrodes, and the insulation rods.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an arrester according to the present invention will be explained below in detail with reference to the accompanying drawings. The present invention is not limited thereto.

Embodiment

Figure 1:
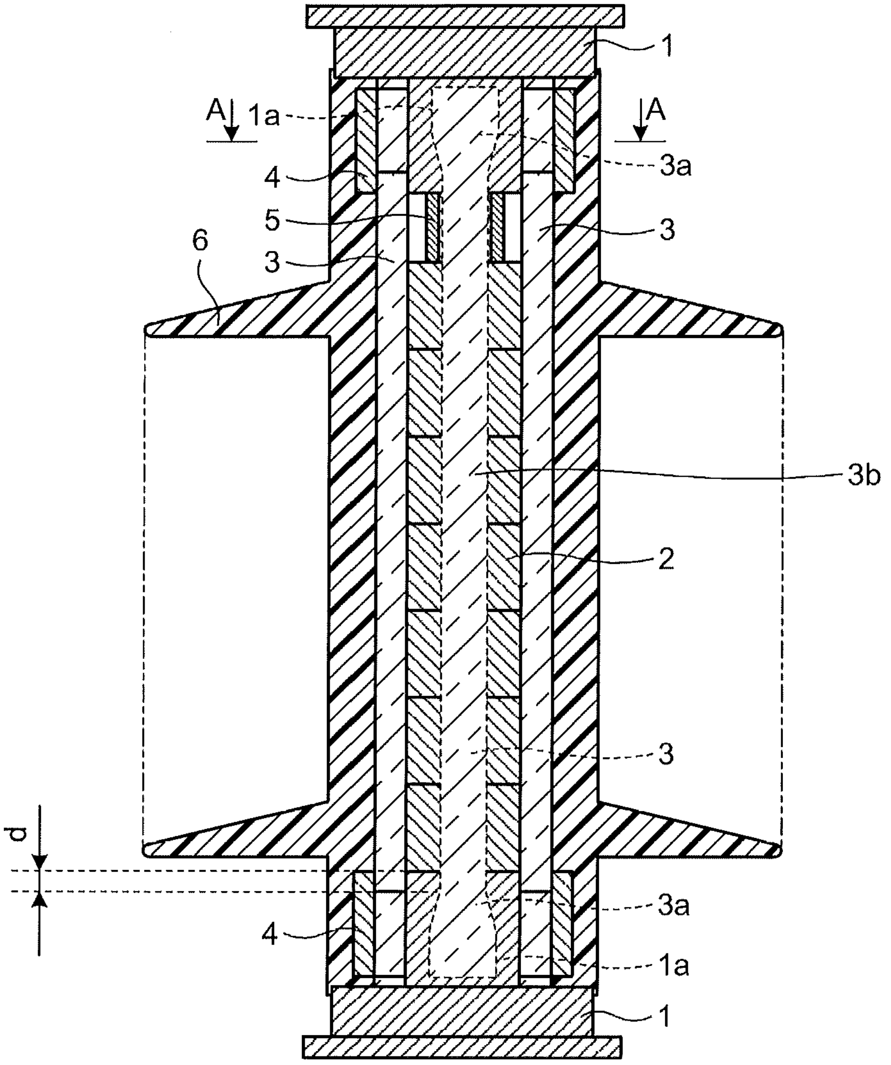
FIG. 1 is a longitudinal cross-sectional view of an arrester according to an embodiment of the present invention.
Figure 2:
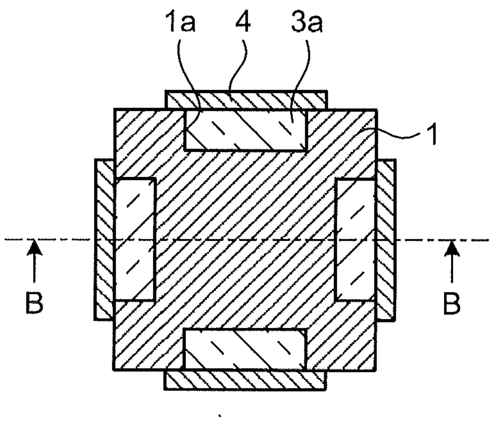
FIG. 2 is a lateral cross-sectional view of an electrode cut along a line A-A shown in FIG. 1.
Figure 3A:
FIG. 3A is a top view of an FRP rod.
Figure 3B:
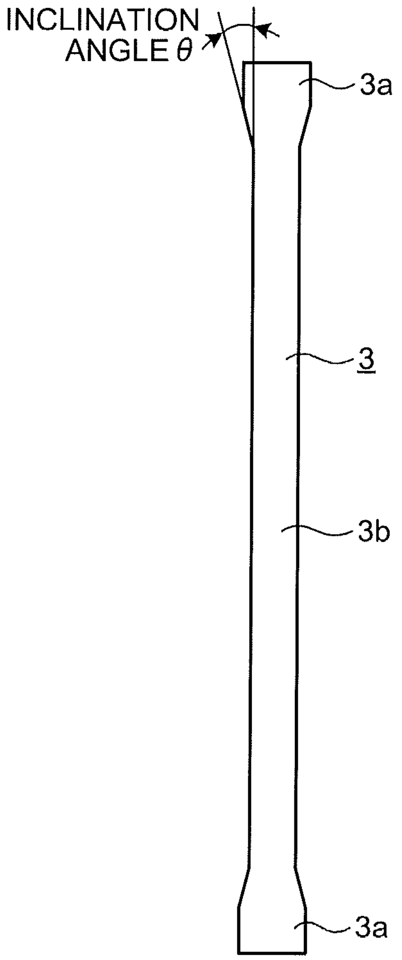
FIG. 3B is a side view of the FRP rod.

FIG. 1 is a longitudinal cross-sectional view of an arrester according to an embodiment of the present invention. FIG. 2 is a lateral cross-sectional view of an electrode 1 cut along a line A-A shown in FIG. 1. FIG. 3A is a top view of an FRP rod 3, and FIG. 3B is a side view of the FRP rod 3. A configuration of the arrester according to the present embodiment is explained with reference to FIGS. 1 to 3.

The arrester according to the present embodiment includes an internal element 2, a pressing spring 5, a pair of electrodes 1, a plurality of FRP (glass fiber reinforced plastic) rods 3, a plurality of stopping plates 4, and an outer cover 6. The internal element 2 includes a nonlinear resistive element, which is for example, a plurality of zinc oxide elements stacked. The pressing spring 5 is arranged on one end surface of the internal element 2 in a stacking direction. The electrodes 1 are respectively arranged on both ends of a serial member constituted with the internal element 2 and the pressing spring 5. The FRP ods 3 respectively include protruding portions 3*a* each having a dumbbell shape, arranged so as to surround the internal element 2, and provided at both end portions. Each of the protruding portions 3*a* is configured to be fitted into an electrode groove 1*a* provided on each of the electrodes 1, by which the electrodes 1 are coupled to each other. Each of the stopping plates 4 prevents the protruding portion 3*a* fitted into the electrode groove 1*a* from being removed from the electrode groove 1*a*. The outer cover 6 integrally molds the internal element 2, the pressing spring 5, the electrode 1, the FRP rod 3, and the stopping plates 4 with polymer material such as silicon rubber. FIG. 1 is a cross-sectional view of the arrester cut along a line B-B shown in FIG. 2, and although the FRP rod 3 located at the center in FIG. 1 among the FRP rods 3 is actually arranged on the back side of the internal element 2, it is shown together with two FRP rods 3 on both sides in FIG. 1 so as to clarify the arrangement configuration.

The FRP rod 3 is an insulation rod having a flat plate shape extending along the stacking direction of the internal element 2 (see FIGS. 1, 2, and 3A), and includes the protruding portion 3*a* provided at each of both end portions and a base portion 3*b*. The protruding portion 3*a* is wider than the base portion 3*b*, and has a dumbbell shape, which is symmetric with respect to its extending direction (axial direction) (see FIGS. 1 and 3B). That is, the protruding portion 3*a* has a dumbbell shape with a first portion in which a width thereof is increased from the center side to the end side of the FRP rod 3 with a substantially constant inclination angle θ and a second portion having a constant width continuing from the first portion, which is protruded symmetrically with respect to the extending direction of the FRP rod 3. The base portion 3*b* is a portion having a constant width other than the both end portions where the protruding portions 3*a* are respectively provided.

As described later, it is preferred that the inclination angle θ is set to a small angle of equal to or less than 20 degrees, for example. Furthermore, a connecting portion (boundary) of the base portion 3*b* and the protruding portion 3*a* of the FRP rod 3 and a connecting portion (boundary) of the first portion and the second portion in the protruding portion 3*a* are connected, for example, smoothly from the aspect of ease of processing and relax of a stress. By providing the protruding portion 3*a*, the FRP rod 3 is prevented from being falling off from the electrode 1. For example, four FRP rods 3 are arranged in the arrester (see FIG. 2).

A cross section of at least a portion of the electrode 1, into which the protruding portion 3*a* is fitted, has a quadrangular shape (square shape) for example, and the electrode groove 1*a* is provided on each side surface of the portion. The electrode groove 1*a* has substantially the same shape as the protruding portion 3*a*, into which the protruding portion 3*a* is hooked and fitted. The stopping plate 4 prevents the protruding portion 3*a* that is fitted into the electrode groove 1*a* from being removed from the electrode groove 1*a*, and is fixed to the electrode 1 by a bolt or the like. The number of the FRP rods 3 is not limited to four, but can be plural in general. When arranging three or more FRP rods 3, for example, the cross-sectional shape of the electrode 1 can be formed in a polygonal shape according to the number of the FRP rods 3, and the electrode groove 1*a* can be provided on each side surface.

A portion of the FRP rod 3, which is fitted into the electrode 1, includes not only the protruding portion 3*a* of the FRP rod 3 but also a portion of a length d from the protruding portion 3*a* to the center side of the FRP rod 3. That is, the portion of the FRP rod 3, which is fitted into the electrode 1, includes a part of the base portion 3*b*, and a length of the portion is the length d from the protruding portion 3*a* to the base portion 3*b* side. In other words, the connecting portion (boundary) of the base portion 3*b* and the protruding portion 3*a* of the FRP rod 3 is located at the inner side of the electrode 1 by the length d from the protruding portion 3*a*.

The pressing spring 5 is arranged between one of the electrodes 1 and one end surface of the internal element 2 in the stacking direction in a compressed state. With this arrangement, the internal element 2 is fixed by a spring load of the pressing spring 5, and hence it is possible to prevent a position deviation of the internal element 2 due to an impact, for example.

The outer cover 6 includes a plurality of pleats on its outer circumferential surface. The pleats are arranged along the stacking direction of the internal element 2 at substantially constant intervals, for example.

An functional effect of the present embodiment is described below. In the present embodiment, the protruding portion 3*a* having a dumbbell shape with an inclination angle θ smaller than 90 degrees is provided at each of both end portions of the FRP rod 3, and the protruding portion 3*a* is hooked and fixed to the electrode 1 that includes the electrode groove 1*a* having substantially the same shape as the protruding portion 3*a*. With this configuration, the concentration of a stress applied to the protruding portion 3*a* when a bending load or a tensile load is applied to the arrester can be relaxed, and as a result, the mechanical strength of the arrester can be improved.

Figure 4:
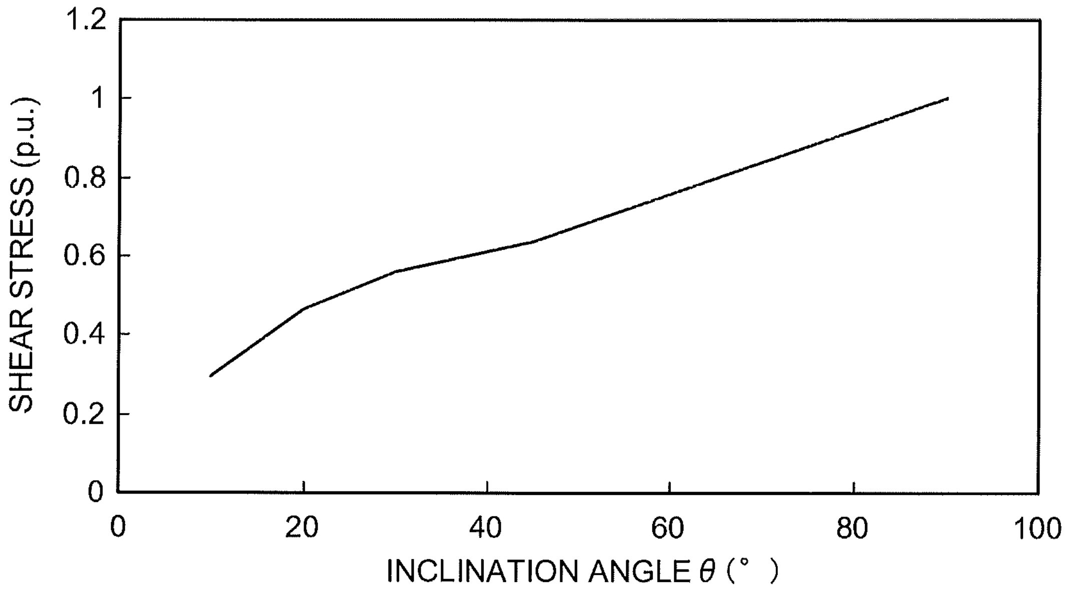
FIG. 4 is a graph of a relationship between an inclination angle θ (degrees) of a protruding portion and a shear stress (p.u.) of the protruding portion when a tensile load is applied.

That is, in the present embodiment, by providing the first portion of which the width increases with a substantially constant inclination angle θ from the center side to the end side of the FRP rod 3 on the protruding portion 3*a*, it is possible to relax the concentration of a shear stress generated in the protruding portion 3*a* when a tensile load is applied to the arrester, as compared to a configuration in which only the second portion is provided (the inclination angle is a right angle). In this case, it is preferred that the inclination angle θ is a small angle of equal to or less than 20 degrees, for example. FIG. 4 is a graph of a relationship between the inclination angle θ (degrees) of the protruding portion 3*a* and the shear stress (p.u.) of the protruding portion 3*a* when a tensile load is applied to the arrester. As shown in FIG. 4, when the inclination angle θ is 20 degrees, for example, the shear stress due to the tensile load is reduced by about 30% as compared to a case where the inclination angle θ is 45 degrees, and when the inclination angle θ is 10 degrees, the shear stress due to the tensile load is reduced by about 50% as compared to the case where the inclination angle θ is 45 degrees. Therefore, in the present embodiment, by setting the inclination angle θ to be equal to or less than 20 degrees, it is possible to achieve an improvement in the shear strength.

Figure 5:
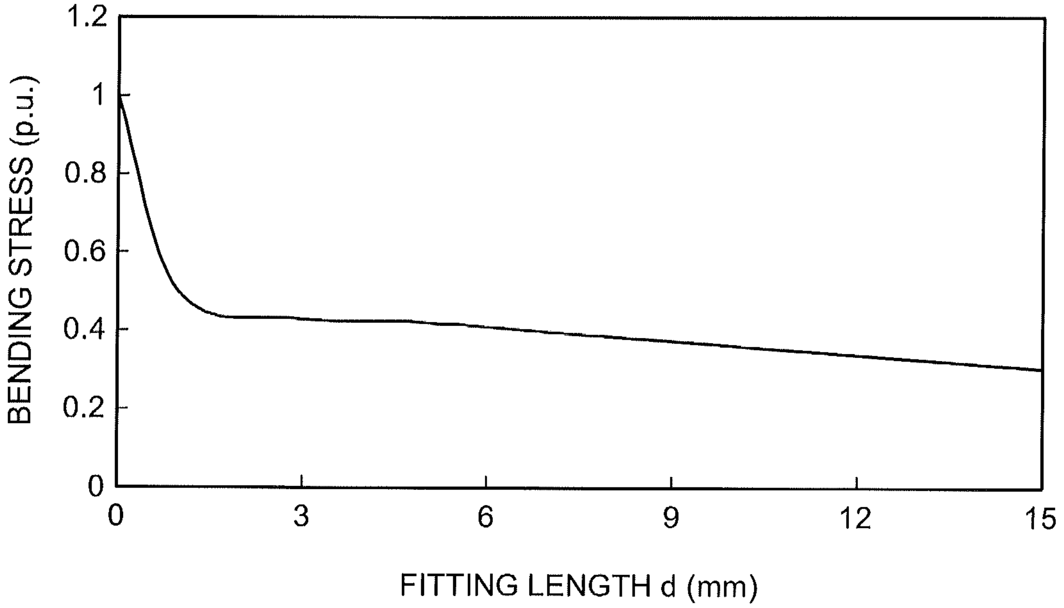
FIG. 5 is a graph of a relationship between a fitting length d from the protruding portion to the center side of the FRP rod in an axial direction and a bending stress (p.u.) of the protruding portion when a bending load is applied.

Further, in the present embodiment, the fitting portion of the FRP rod 3 with the electrode 1 includes not only the protruding portion 3*a* but also a part of the base portion 3*b* from the protruding portion 3*a* to the center side of the FRP rod 3 in the axial direction. When the length of the part of the base portion 3*b* from the protruding portion 3*a* to the center side of the FRP rod 3 in the axial direction is referred to as d, it is preferred that this fitting length d is equal to or longer than 3 millimeters, for example. With this configuration, it is possible to relax the concentration of a stress of a bending load generated in the protruding portion 3*a* when the bending load is applied to the arrester, as compared to a fitting with only the protruding portion 3*a*. FIG. 5 is a graph of a relationship between the fitting length d from the protruding portion 3*a* to the center side of the FRP rod 3 in the axial direction and the bending stress (p.u.) of the protruding portion 3*a* when the bending load is applied to the arrester. For example, when the fitting length d from the protruding portion 3*a* is set to 3 millimeters, the bending stress is reduced by about 60% as compared to a case where the fitting length d is 0 millimeter (fitting only with the protruding portion 3*a*). Therefore, in the present embodiment, it is possible to achieve an improvement in the bending strength without increasing the width of the FRP rod 3, unlike a case where only the protruding portion 3*a* is fitted into the electrode 1.

In the present embodiment, by forming the protruding portion 3*a* in a dumbbell shape, it is possible to achieve an improvement in the shear strength without increasing the dimension of the protruding portion 3*a* when an inclination angle θ of the protruding portion 3*a* is set to a constant angle, as compared to a case where the shape of the protruding portion 3*a* is isosceles triangular (see FIG. 1 of Japanese Patent Application Laid-open No. 2003-297609).

In the present embodiment, because the fitting portion of the FRP rod 3 with the electrode 1 includes a part of the base portion 3*b* from the protruding portion 3*a* to the center side of the FRP rod 3 in the axial direction, it is possible to achieve an improvement in the bending strength, as compared to a configuration in which the base itself of the wide portion is arranged at a boundary between the electrode and the internal element as shown in FIG. 1 of Japanese Patent Application Laid-open No. 2003-297609.

In the present embodiment, because the sizes of the protruding portion 3*a* and the electrode 1 into which the protruding portion 3*a* is fitted can be reduced by forming the protruding portion 3*a* in a dumbbell shape, as compared to a case where the shape of the protruding portion 3*a* is isosceles triangular (see FIG. 1 of Japanese Patent Application Laid-open No. 2003-297609), it is possible to achieve a cost reduction. In addition, by forming the protruding portion 3*a* in a dumbbell shape, the FRP rod 3 can be processed from a plate having a smaller width as compared to a case where the shape of the protruding portion 3*a* is isosceles triangular, and as a result, the size of a portion to be processed can be reduced and it is possible to improve cost effectiveness.

Although the FRP rod 3 is arranged so as to surround the internal element 2 in the present embodiment, it can be also configured such that other insulation rod is arranged instead of the FRP rod 3.

According to the present invention, when a load is applied to the arrester from outside, a stress generated in the FRP is relaxed, and as a result, it is possible to provide an arrester with an improved mechanical strength.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An arrester comprising:

a nonlinear resistive element which is stacked;

a pair of electrodes respectively arranged on both end sides of the nonlinear resistive element in a stacking direction;

a plurality of insulation rods arranged so as to surround the nonlinear resistive element, each of the insulation rods having a flat plate shape extending in the stacking direction and including end portions in a dumbbell shape with a width increasing from a center side to an end side in an axial direction at a constant inclination angle and then becoming a constant width thereafter, the insulation rods being fixed by the end portions respectively being fitted into electrode grooves respectively provided on the pair of electrodes; and an outer cover formed of polymer material and integrally covering at least the nonlinear resistive element, the pair of electrodes, and the insulation rods.

2. The arrester according to claim 1, wherein the inclination angle is equal to or less than 20 degrees.

3. The arrester according to claim 1, wherein a fitting portion of the insulation rod with the electrode groove includes not only the end portion but also a part of a base portion of the insulation rod from the end portion to the center side in the axial direction by a predetermined length.

4. The arrester according to claim 3, wherein the predetermined length is equal to or longer than 3 millimeters.

5. The arrester according to claim 1, wherein the electrode has a polygonal-shaped cross section according to number of the insulation rods, the electrode groove is provided on each side surface of the electrode, and the end portion fitted into the electrode groove is fixed by a stopping plate.

* * * * *